United States Patent
Ono

(10) Patent No.: US 9,128,645 B2
(45) Date of Patent: Sep. 8, 2015

(54) SYSTEM INCLUDING IMAGE FORMING APPARATUS AND INFORMATION PROCESSING APPARATUS, METHOD PERFORMED UNDER THE SYSTEM, IMAGE FORMING APPARATUS AND INFORMATION PROCESSING APPARATUS DIRECTED TO THE SYSTEM, AND NON-TRANSITORY STORAGE MEDIUM ENCODED WITH PROGRAM DIRECTED TO THE APPARATUSES

(75) Inventor: Tomomi Ono, Akashi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 61 days.

(21) Appl. No.: 13/536,537

(22) Filed: Jun. 28, 2012

(65) Prior Publication Data

US 2013/0014218 A1 Jan. 10, 2013

(30) Foreign Application Priority Data

Jul. 5, 2011 (JP) .................................. 2011-149115

(51) Int. Cl.
*G06F 15/173* (2006.01)
*G06F 3/12* (2006.01)
(Continued)

(52) U.S. Cl.
CPC ............ *G06F 3/1204* (2013.01); *G06F 3/1222* (2013.01); *G06F 3/1224* (2013.01);
(Continued)

(58) Field of Classification Search
CPC ......... G06F 15/00; G06F 12/00; G06F 12/16; G06F 3/12; G06F 15/173; G06F 21/00; G06F 21/31; G06K 9/54
USPC ............. 726/3; 709/223; 358/1.15, 1.14, 1.13
See application file for complete search history.

(56) References Cited

U.S. PATENT DOCUMENTS

2007/0041043 A1* 2/2007 Murakami et al. ............ 358/1.15
2011/0320952 A1* 12/2011 Kataoka ......................... 715/735

FOREIGN PATENT DOCUMENTS

| JP | 11-249839 A | 9/1999 |
| JP | 2005-085132 A | 3/2005 |

(Continued)

OTHER PUBLICATIONS

Office Action (Notice of Grounds of Rejection) issued on Nov. 12, 2013, by the Japanese Patent Office in corresponding Japanese Patent Application No. 2011-149115, and an English Translation of the Office Action. (9 pages).

(Continued)

*Primary Examiner* — Brandon Hoffman
*Assistant Examiner* — Samuel Ambaye
(74) *Attorney, Agent, or Firm* — Buchanan Ingersoll & Rooney PC

(57) ABSTRACT

Provided is a system including a first image forming apparatus and an information processing apparatus connected via a network. When a second image forming apparatus is added to the network, the second image forming apparatus generates parent setting information indicating that the first image forming apparatus previously connected to the network is its parent, and transmits the parent setting information to the first image forming apparatus. The first image forming apparatus generates parent-child relationship setting information indicating a parent-child relationship between the first image forming apparatus and the second image forming apparatus, based on the parent setting information from the second image forming apparatus. The information processing apparatus registers the second image forming apparatus as a new output destination, based on information of the second image forming apparatus.

19 Claims, 15 Drawing Sheets

(51) Int. Cl.
  *H04L 12/24* (2006.01)
  *H04L 29/06* (2006.01)
  *G06F 21/31* (2013.01)
  *G06F 15/00* (2006.01)
  *G06F 12/16* (2006.01)
  *G06F 21/00* (2013.01)

(52) U.S. Cl.
  CPC ............ *G06F3/1231* (2013.01); *G06F 3/1285* (2013.01); *G06F 3/1291* (2013.01); *G06F 15/173* (2013.01); *H04L 41/0806* (2013.01); *H04L 63/08* (2013.01); *G06F 12/16* (2013.01); *G06F 15/00* (2013.01); *G06F 21/00* (2013.01); *G06F 21/31* (2013.01)

(56) References Cited

FOREIGN PATENT DOCUMENTS

| JP | 2005-301943 A | 10/2005 |
| JP | 2006-163660 A | 6/2006 |
| JP | 2007-230000 A | 9/2007 |
| JP | 2008181450 A | 8/2008 |
| JP | 2009-064177 A | 3/2009 |

OTHER PUBLICATIONS

Chinese Office Action dated Jul. 29, 2014 issued in corresponding Chinese Patent Appln. No. 201210230014.3, with English translation (11 pages).

* cited by examiner

FIG.1
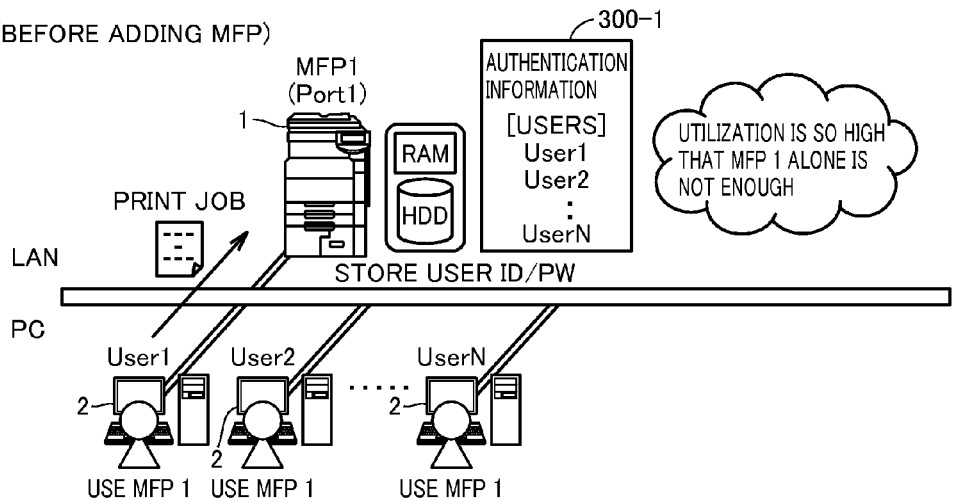
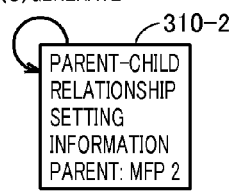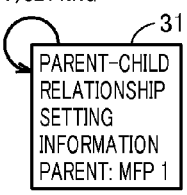
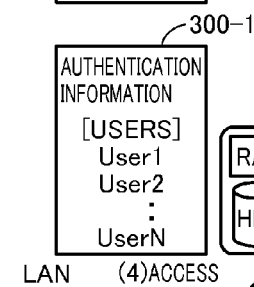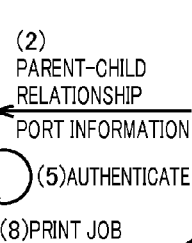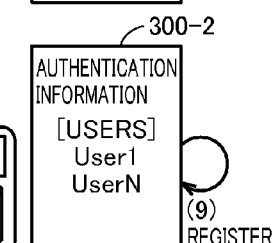
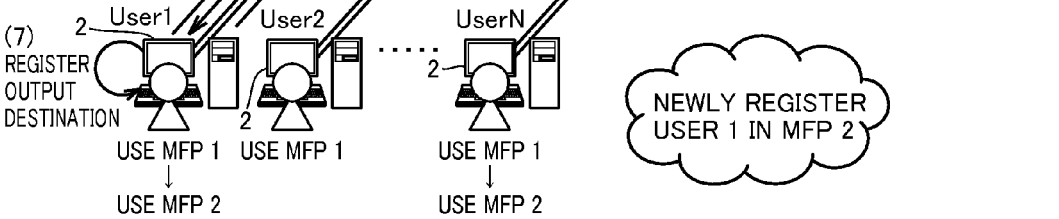

INSTALLATION PLACE  5F BESIDE MR. A

PARENT-CHILD RELATIONSHIP SETTING
PARENT MFP  10.128.32.2

OK (b)

INSTALLATION PLACE  5F BESIDE MR. A

PARENT-CHILD RELATIONSHIP SETTING
PARENT MFP 1  10.128.32.2
PARENT MFP 2  10.128.32.50

|    | USER NAME | PASSWORD    | E-MAIL ADDRESS    |
|----|-----------|-------------|-------------------|
| 1  | User1     | password1   | user1@test.com    |
| 2  | User2     | password2   | user2@test.com    |
| 3  | User3     | password3   | user3@test.com    |
| 4  | User4     | password4   | user4@test.com    |
| 5  | User5     | password5   | user5@test.com    |
| 6  | User6     | password6   | user6@test.com    |
| 7  | User7     | password7   | user7@test.com    |
| 8  | User8     | password8   | user8@test.com    |
| 9  | User9     | password9   | user9@test.com    |
| 10 | User10    | password10  | user10@test.com   |
| 11 | User11    | password11  | user11@test.com   |
| 12 | User12    | password12  | user12@test.com   |
| 13 | User13    | password13  | user13@test.com   |
| 14 | —         | —           | —                 |
| 15 | —         | —           | —                 |

300-2

(b)

|   | USER NAME | PASSWORD  | E-MAIL ADDRESS |
|---|-----------|-----------|----------------|
| 1 | User1     | password1 | user1@test.com |
| 2 | —         | —         | —              |
| 3 | —         | —         | —              |
| 4 | —         | —         | —              |
| 5 | —         | —         | —              |

|    | USER NAME | PASSWORD   | E-MAIL ADDRESS   |           |
|----|-----------|------------|------------------|-----------|
| 1  | —         | —          | —                | → DELETE  |
| 2  | User2     | password2  | user2@test.com   |           |
| 3  | User3     | password3  | user3@test.com   |           |
| 4  | User4     | password4  | user4@test.com   |           |
| 5  | User5     | password5  | user5@test.com   |           |
| 6  | User6     | password6  | user6@test.com   |           |
| 7  | User7     | password7  | user7@test.com   |           |
| 8  | User8     | password8  | user8@test.com   |           |
| 9  | User9     | password9  | user9@test.com   |           |
| 10 | User10    | password10 | user10@test.com  |           |
| 11 | User11    | password11 | user11@test.com  |           |
| 12 | User12    | password12 | user12@test.com  |           |
| 13 | User13    | password13 | user13@test.com  |           |
| 14 | —         | —          | —                |           |
| 15 | —         | —          | —                |           |

|   | USER NAME | PASSWORD | E-MAIL ADDRESS |
|---|---|---|---|
| 1 | User11 | password11 | user11@test.com |
| 2 | User12 | password12 | user12@test.com |
| 3 | User13 | password13 | user13@test.com |
| 4 | User14 | password14 | user14@test.com |
| 5 | User15 | password15 | user15@test.com |
| 6 | User16 | password16 | user16@test.com |
| 7 | User17 | password17 | user17@test.com |
| 8 | User18 | password18 | user18@test.com |
| 9 | User19 | password19 | user19@test.com |
| 10 | — | — | — |

|   | USER NAME | PASSWORD | E-MAIL ADDRESS |
|---|---|---|---|
| 1 | User11 | password11 | user11@test.com |
| 2 | — | — | — |
| 3 | User13 | password13 | user13@test.com |
| 4 | User14 | password14 | user14@test.com |
| 5 | User15 | password15 | user15@test.com |
| 6 | — | — | — |
| 7 | User17 | password17 | user17@test.com |
| 8 | User18 | password18 | user18@test.com |
| 9 | User19 | password19 | user19@test.com |
| 10 | — | — | — |

(b)

|   | USER NAME | PASSWORD | E-MAIL ADDRESS |
|---|---|---|---|
| 1 | User21 | password21 | user21@test.com |
| 2 | User22 | password22 | user22@test.com |
| 3 | User23 | password23 | user23@test.com |
| 4 | User24 | password24 | user24@test.com |
| 5 | User25 | password25 | user25@test.com |
| 6 | User26 | password26 | user26@test.com |
| 7 | User27 | password27 | user27@test.com |
| 8 | User28 | password28 | user28@test.com |
| 9 | User29 | password29 | user29@test.com |
| 10 | — | — | — |

|   | USER NAME | PASSWORD | E-MAIL ADDRESS |
|---|---|---|---|
| 1 | User21 | password21 | user21@test.com |
| 2 | User22 | password22 | user22@test.com |
| 3 | User23 | password23 | user23@test.com |
| 4 | — | — | — |
| 5 | User25 | password25 | user25@test.com |
| 6 | User26 | password26 | user26@test.com |
| 7 | User27 | password27 | user27@test.com |
| 8 | — | — | — |
| 9 | — | — | — |
| 10 | — | — | — |

(c)

|   | USER NAME | PASSWORD | E-MAIL ADDRESS |
|---|---|---|---|
| 1 | User31 | password31 | user31@test.com |
| 2 | User32 | password32 | user32@test.com |
| 3 | User33 | password33 | user33@test.com |
| 4 | User34 | password34 | user34@test.com |
| 5 | User35 | password35 | user35@test.com |
| 6 | User36 | password36 | user36@test.com |
| 7 | User37 | password37 | user37@test.com |
| 8 | User38 | password38 | user38@test.com |
| 9 | User39 | password39 | user39@test.com |
| 10 | — | — | — |

|   | USER NAME | PASSWORD | E-MAIL ADDRESS |
|---|---|---|---|
| 1 | User31 | password31 | user31@test.com |
| 2 | User32 | password32 | user32@test.com |
| 3 | User33 | password33 | user33@test.com |
| 4 | User34 | password34 | user34@test.com |
| 5 | User35 | password35 | user35@test.com |
| 6 | User36 | password36 | user36@test.com |
| 7 | User37 | password37 | user37@test.com |
| 8 | User38 | password38 | user38@test.com |
| 9 | User39 | password39 | user39@test.com |
| 10 | — | — | — |

(d)

|   | USER NAME | PASSWORD | E-MAIL ADDRESS |
|---|---|---|---|
| 1 | — | — | — |
| 2 | — | — | — |
| 3 | — | — | — |
| 4 | — | — | — |
| 5 | — | — | — |
| 6 | — | — | — |
| 7 | — | — | — |
| 8 | — | — | — |
| 9 | — | — | — |
| 10 | — | — | — |

|   | USER NAME | PASSWORD | E-MAIL ADDRESS |
|---|---|---|---|
| 1 | User12 | password12 | user12@test.com |
| 2 | User16 | password16 | user16@test.com |
| 3 | User24 | password24 | user24@test.com |
| 4 | User28 | password28 | user28@test.com |
| 5 | User29 | password29 | user29@test.com |
| 6 | — | — | — |
| 7 | — | — | — |
| 8 | — | — | — |
| 9 | — | — | — |
| 10 | — | — | — |

SYSTEM INCLUDING IMAGE FORMING APPARATUS AND INFORMATION PROCESSING APPARATUS, METHOD PERFORMED UNDER THE SYSTEM, IMAGE FORMING APPARATUS AND INFORMATION PROCESSING APPARATUS DIRECTED TO THE SYSTEM, AND NON-TRANSITORY STORAGE MEDIUM ENCODED WITH PROGRAM DIRECTED TO THE APPARATUSES

This application is based on Japanese Patent Application No. 2011-149115 filed with the Japan Patent Office on Jul. 5, 2011, the entire content of which is hereby incorporated by reference.

BACKGROUND OF THE INVENTION

1. Field of the Invention

The present invention relates to a system including an image forming apparatus and an information processing apparatus, a method performed under the system, an image forming apparatus and an information processing apparatus directed to the system, and a non-transitory storage medium encoded with a program directed to the apparatuses.

2. Description of the Related Art

Conventionally, it is common that image forming apparatuses such as Multi-Functional Peripherals (MFPs), printers, and facsimiles are connected via a network to print a print job transmitted via the network from a variety of terminal devices (for example, personal computers). By adopting such a network configuration, an image forming apparatus can be flexibly added even when the number of terminal devices increases so that the load on the image forming apparatus becomes heavy.

On the other hand, when using such an image forming apparatus, authentication of a user to use the apparatus is frequently performed for the sake of security. When a new image forming apparatus is added in a state in which user authentication is performed in the existing image forming apparatus, it is necessary to allow the added image forming apparatus to perform user authentication in the same way.

On the part of the terminal devices, it is necessary to add the newly added image forming apparatus as an output destination or to change output destinations.

In connection with such procedures, for example, Japanese Laid-Open Patent Publication No. 2005-085132 discloses a method of changing a default printer according to the priority of the default printer when a printer status is changed.

Japanese Laid-Open Patent Publication No. 2006-163660 discloses a method of automatically selecting an optimum printer that meets the print conditions by acquiring the performance and function information of a printer on a network.

There is also a known technique in which a parent-child (or master-slave relationship) relationship is set among a plurality of devices, and the child device inherits all the setting information in the parent device.

In a network to which image forming apparatuses having the user authentication function are connected as described above, when adding a new image forming apparatus, the administrator has to register users in the newly added image forming apparatus and to register the newly added image forming apparatus as an output destination in each terminal device as well. This operation requires time and effort.

As a specific example, it is necessary to newly install a printer driver of the newly added image forming apparatus or to associate an output destination (print port) associated with a printer driver of the existing image forming apparatus, with the newly added image forming apparatus.

However, in the technique in Japanese Laid-Open Patent Publication No. 2005-085132 as described above, settings have to be made in each image forming apparatus to accommodate the user authentication function. In the technique in Japanese Laid-Open Patent Publication No. 2006-163660, the printer cannot be used unless the user to be authenticated is registered beforehand.

SUMMARY OF THE INVENTION

The present invention is directed to provision of a system and the like for saving trouble of making the settings for a newly added image forming apparatus and for simplifying the settings by a user who uses the added image forming apparatus, in an environment requiring security.

A system according to an aspect of the present invention includes a first image forming apparatus and an information processing apparatus connected via a network. When a second image forming apparatus is added to the network, the second image forming apparatus generates parent setting information indicating that the first image forming apparatus previously connected to the network is its parent, and transmits the parent setting information to the first image forming apparatus. The first image forming apparatus includes a generation unit for generating parent-child relationship setting information indicating a parent-child relationship between the first image forming apparatus and the second image forming apparatus, based on the parent setting information from the second image forming apparatus, and a transmission unit for transmitting information of the second image forming apparatus to the information processing apparatus, based on the parent-child relationship setting information, in response to access from the information processing apparatus. The information processing apparatus includes a first registration unit for registering the second image forming apparatus as a new output destination, based on the information of the second image forming apparatus.

Preferably, the first image forming apparatus further includes a first authentication unit for performing authentication by referring to authentication information registered beforehand, in response to access from the information processing apparatus, and the transmission unit transmits the information of the second image forming apparatus on condition that the authentication is successful.

Further preferably, the second image forming apparatus further includes a second registration unit for registering information about the information processing apparatus as at least part of authentication information held by the second image forming apparatus, in response to a print instruction from the information processing apparatus.

Preferably, the transmission unit further transmits the authentication information to the second image forming apparatus, in response to the parent setting information from the second image forming apparatus. The second image forming apparatus further includes a second authentication unit for performing authentication by referring to the authentication information from the first image forming apparatus, in response to access from the information processing apparatus.

Preferably, the first registration unit includes a unit for displaying a list of output destinations, and a unit for accepting a choice by a user from the displayed list.

Preferably, the information processing apparatus further includes an acquisition unit for acquiring a necessary printer driver from the second image forming apparatus when a printer driver corresponding to the second image forming apparatus does not exist.

Preferably, the access to the first image forming apparatus from the information processing apparatus includes a print instruction from the information processing apparatus.

Preferably, the first registration unit registers a new output destination on a user interface screen provided by a printer driver of the information processing apparatus.

Preferably, the second image forming apparatus generates the parent setting information based on a response from another image forming apparatus that has responded to a broadcast.

According to another aspect of the present invention, a method performed under a system comprising a first image forming apparatus and an information processing apparatus connected via a network, comprising the steps of: generating, by a second image forming apparatus, parent setting information indicating that the first image forming apparatus previously connected to the network is a parent of the second image forming apparatus, when the second image forming apparatus is added to the network; transmitting parent setting information from the second image forming apparatus to the first image forming apparatus; generating, by the first image forming apparatus, parent-child relationship setting information indicating a parent-child relationship between the first image forming apparatus and the second image forming apparatus, based on the parent setting information from the second image forming apparatus, transmitting, by the first image forming apparatus, information of the second image forming apparatus to the information processing apparatus, based on the parent-child relationship setting information, in response to access from the information processing apparatus, and registering, by the information processing apparatus, the second image forming apparatus as a new output destination, based on the information of the second image forming apparatus.

According to a further aspect of the present invention, an image forming apparatus connectable to an information processing apparatus and another image forming apparatus via a network is provided. The image forming apparatus includes: a generation unit for generating parent-child relationship setting information indicating a parent-child relationship between a first image forming apparatus and a second image forming apparatus, based on parent setting information from another image forming apparatus indicating that the image forming apparatus is a parent of the another image forming apparatus; and a transmission unit for transmitting information of the another image forming apparatus to the information processing apparatus, based on the parent-child relationship setting information, in response to access from the information processing apparatus.

According to a further aspect of the present invention, a non-transitory storage medium encoded with a program executed in an image forming apparatus connectable to an information processing apparatus and another image forming apparatus via a network is provided. The program causes the image forming apparatus to execute processing comprising the steps of: generating parent-child relationship setting information indicating a parent-child relationship between a first image forming apparatus and a second image forming apparatus, based on parent setting information from another image forming apparatus indicating that the image forming apparatus is a parent of the another image forming apparatus; and transmitting information of the another image forming apparatus to the information processing apparatus, based on the parent-child relationship setting information, in response to access from the information processing apparatus.

According to a still further aspect of the present invention, an image forming apparatus connectable to an information processing apparatus and another image forming apparatus via a network is provided. The image forming apparatus includes: generation means for generating parent setting information indicating that another image forming apparatus previously connected to the network is a parent of the image forming apparatus, when the image forming apparatus is added to the network; and transmission means for transmitting the parent setting information to the another image forming apparatus.

According to yet another aspect of the present invention, a non-transitory storage medium encoded with a program executed in an image forming apparatus connectable to an information processing apparatus and another image forming apparatus via a network is provided. The program causes the image forming apparatus to execute processing comprising the steps of: generating parent setting information indicating that another image forming apparatus previously connected to the network is a parent of the image forming apparatus, when the image forming apparatus is added to the network; and transmitting the parent setting information to the another image forming apparatus.

According to still another aspect of the present invention, an information processing apparatus connectable to a plurality of image forming apparatuses via a network is provided. The information processing apparatus includes: receiving means for, when a second image forming apparatus is newly added in a state in which a first image forming apparatus is connected to the network, receiving information of the second image forming apparatus based on parent-child relationship setting information from the first image forming apparatus, after the parent-child relationship setting information is set to indicate that the first image forming apparatus is a parent of the second image forming apparatus; and registration means for registering the second image forming apparatus as a new output destination, based on the information of the second image forming apparatus.

According to a further aspect of the present invention, a non-transitory storage medium encoded with a program executed in an information processing apparatus connectable to a plurality of image forming apparatuses via a network is provided. The program causes the information processing apparatus to execute processing comprising the steps of: receiving information of a second image forming apparatus based on parent-child relationship setting information from a first image forming apparatus, after the parent-child relationship setting information is set to indicate that the first image forming apparatus is a parent of the second image forming apparatus, after the second image forming apparatus is newly added in a state in which the first image forming apparatus is connected to the network; and registering the second image forming apparatus as a new output destination, based on the information of the second image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram for explaining an operation overview in a network system according to an embodiment of the present invention.

FIG. 5 shows an example of a user interface screen in connection with initial settings in the image forming apparatus according to the present embodiment.

FIG. 7 and FIG. 8 show an example of a change in authentication information in user registration in the image forming apparatus according to the present embodiment.

FIG. 15 shows an example of a change in authentication information in the image forming apparatus according to the second modification of the present embodiment.

DESCRIPTION OF THE PREFERRED EMBODIMENTS

Figure 2:
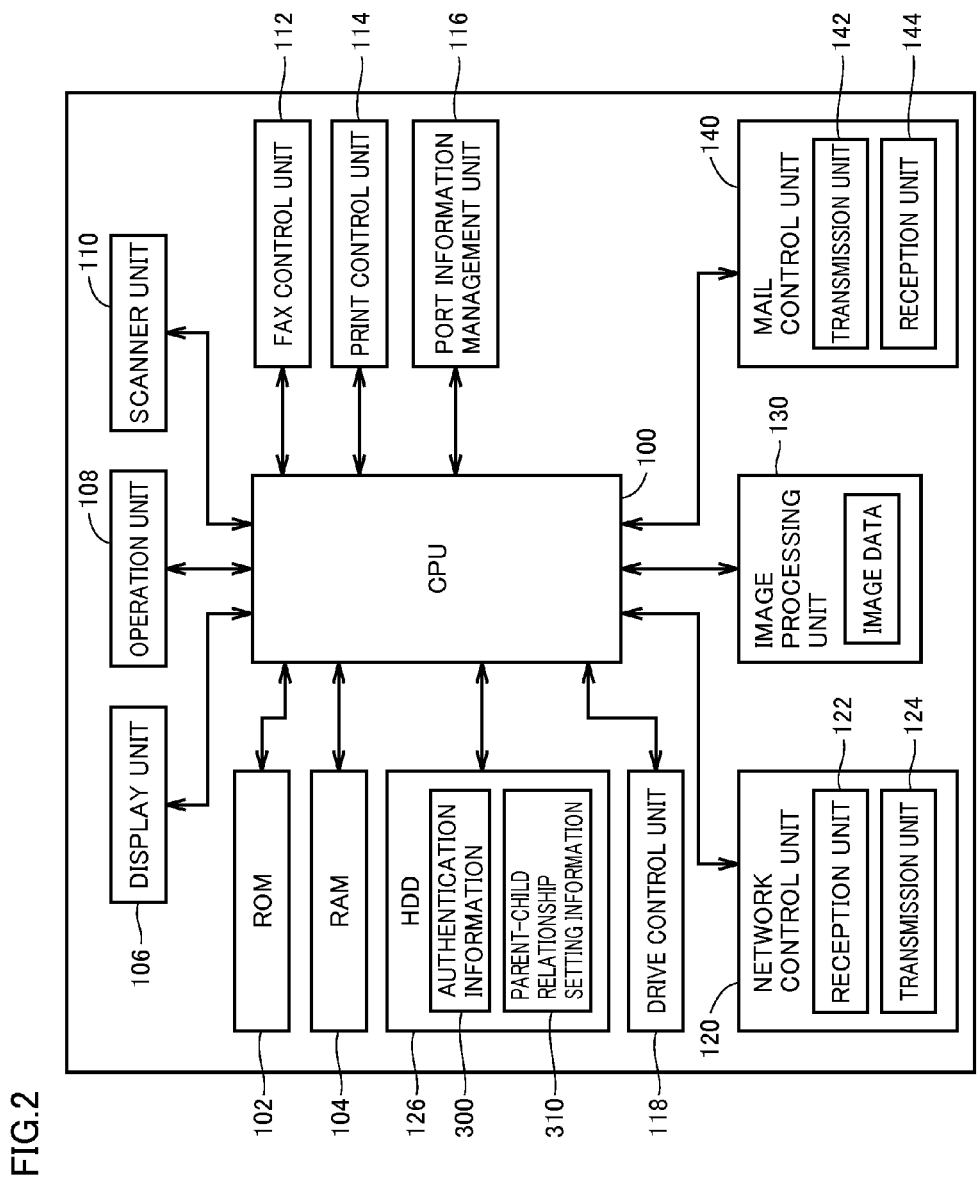
FIG. 2 is a block diagram showing an apparatus configuration of an image forming apparatus according to the present embodiment.

Embodiments of the present invention will be described in detail with reference to the figures. It is noted that the same or corresponding parts in the figures are denoted with the same reference numerals, and a description thereof will not be repeated.

A. Operation Overview

Referring to FIG. 1, first, an operation overview of a network system according to the present embodiment will be described.

FIG. 1 is a schematic diagram for explaining an operation overview in a network system according to an embodiment of the present invention. Referring to (a) in FIG. 1, an image forming apparatus 1 (MFP 1) and a plurality of personal computers 2 as information processing apparatuses are connected to a network such as a LAN (Local Area Network). A plurality of personal computers 2 are used by respective different users (User 1, User 2, . . . , User N). In other words, the network system shown in (a) in FIG. 1 includes an image forming apparatus and information processing apparatuses connected via a network.

Image forming apparatus 1 holds authentication information 300-1 and executes an authentication process based on the authentication information 300-1. Printing at image forming apparatus 1 is permitted only when the authentication process is successful. More specifically, a user ID and a corresponding password (PW) are associated and stored in authentication information 300-1 for each user. If access (typically, a print instruction) is made from any one of personal computers 2, it is determined whether the access is from the user already registered in authentication information 300-1, based on the user ID and password entered by the user of that personal computer 2. The authentication in this manner ensures security.

In the system shown in (a) in FIG. 1, it is assumed that the utilization of MFP 1 is so high that MFP 1 alone is not enough. As shown in (b) in FIG. 1, it is assumed that another image forming apparatus 1 (MFP 2) is added to the existing network, by way of example. In such an environment that requires security, when image forming apparatus 1 is newly added, the present embodiment saves the time and effort for making the settings for the added image forming apparatus 1 and simplifies the settings by the user who uses the added image forming apparatus 1. More specifically, the following procedure allows the user to readily use the added image forming apparatus 1 (MFP 2).

First, the administrator sets an IP (Internet Protocol) address and the like of MFP 2 to connect MFP 2 to the network and sets another image forming apparatus (in this example, MFP 1) serving as the parent for MFP 2. More specifically, when image forming apparatus 1 (MFP 2) is added to the network, MFP 2 generates parent setting information indicating that MFP 1 previously connected to the network is its parent (a procedural step (1) in (b) in FIG. 1). More specifically, MFP 2 generates or updates parent-child relationship setting information 310-2. The IP address and the like of MFP 1 serving as its parent is stored in the parent-child relationship setting information 310-02.

Then, the parent setting information (parent-child relationship setting information 310-2) is transmitted from MFP 2 to MFP 1 (a procedural step (2) in (b) in FIG. 1). More specifically, the parent-child relationship between MFP 1 and MFP 2, port information on the part of MFP 2, and the like are transmitted.

MFP 1 then generates parent-child relationship setting information indicating the parent-child relationship between MFP 1 and MFP 2, based on the parent setting information from MFP 2 (a procedural step (3) in (b) in FIG. 1). More specifically, MFP 1 generates or updates parent-child relationship setting information 310-1. The IP address and the like of MFP 2 that is the child of MFP 1 is stored in this parent-child relationship setting information 310-1.

The setting of parent-child relationship between MFP 1 and MFP 2 is completed through the procedure above.

It is assumed that any user who operates personal computer 2 subsequently gives a print instruction (transmits a print job) to MFP 1 (a procedural step (4) in (b) in FIG. 1).

In response to the access from this personal computer 2, MFP 1 executes an authentication process by referring to the authentication information registered beforehand (authentication information 300-1) (a procedural step (5) in (b) in FIG. 1). Then, MFP 1 transmits the information of MFP 2 to personal computer 2 based on the parent-child relationship setting information 310-1, in response to the access from this personal computer 2 (a procedural step (6) in (b) in FIG. 1). On condition that the authentication is successful, MFP 1 transmits the information of MFP 2 to personal computer 2.

Personal computer 2 registers MFP 2 as a new output destination, based on the information of MFP 2 from MFP 1 (a procedural step (7) in (b) in FIG. 1). The registration as a new output destination is executed on a user interface screen provided by a printer driver of personal computer 2. That is, personal computer 2 registers a new output destination on the user interface screen provided by that personal computer 2. More specifically, in the registration of a new output destination, a list of output destinations is displayed to allow the user to make a choice from the displayed list. The user interface screen will be described later.

If a printer driver corresponding to MFP 2 does not exist, personal computer 2 acquires a necessary printer driver from MFP 2. More specifically, MFP 2 holds a printer driver corresponding to itself, so that this printer driver is downloaded in responses to a request from personal computer 2.

This process enables personal computer 2 to use MFP 2. Then, when the user of personal computer 2 gives a print instruction with MFP 2 designated as an output destination, the print job is transmitted to MFP 2 (a procedural step (8) in (b) in FIG. 1). Then, MFP 2 registers the information about personal computer 2 as at least part of authentication information (authentication information 300-2) held by MFP 2, in response to the print instruction (print job) from personal computer 2. That is, MFP 2 updates the registered contents of authentication information 300-2 based on the initial access so that it can perform an authentication process for the subsequent access from personal computer 2. Here, basically, MFP 2 automatically registers the access from personal computer 2 in authentication information 300-2 because personal computer 2 has already been authenticated by MFP 1.

MFP 1 may transmit authentication information 300-1 to MFP 2 in response to the parent setting information from MFP 2, so that MFP 2 can perform authentication by referring to authentication information 300-1 from MFP 1, in response to access from personal computer 2.

B. Apparatus Configuration of Image Forming Apparatus

An apparatus configuration of image forming apparatus 1 directed to the network system according to the present embodiment will now be described. FIG. 2 is a block diagram showing an apparatus configuration of image forming apparatus 1 according to the present embodiment.

Referring to FIG. 2, image forming apparatus 1 includes a CPU (Central Processing Unit) 100, a ROM (Read Only Memory) 102, a RAM (Random Access Memory) 104, a display unit 106, an operation unit 108, a scanner unit 110, a FAX control unit 112, a print control unit 114, a port information management unit 116, a drive control unit 118, a network control unit 120, an HDD (Hard Disk Drive) 126, an image processing unit 130, and a mail control unit 140.

CPU 100 is a processor for providing various functions by executing a program stored in ROM 102 or HDD 126. Specifically, CPU 100 implements the function provided by image forming apparatus 1 by executing a program. ROM 102 is a nonvolatile memory to store a program executed by CPU 100 or store various parameters necessary to execute a program in CPU 100. RAM 104 is a volatile memory and functions as a working memory for holding a program executed by CPU 100 or temporary data.

Display unit 106 is a user interface for notifying a user about a variety of information in image forming apparatus 1. Operation unit 108 accepts a variety of user operations. In general, a touch panel having display unit 106 combined with operation unit 108 is often adopted. In addition, a variety of keys including a ten-key pad are used as operation unit 108.

HDD 126 stores authentication information 300 for use in an authentication process and parent-child relationship setting information 310 that defines the parent-child relationship with another image forming apparatus.

Scanner unit 110 includes optics such as a CCD (Charge Coupled Device) and a lens to scan image data from a document. FAX control unit 112 controls facsimile transmission/reception to/from another image forming apparatus and the like. Print control unit 114 controls a print process of image data. Port information management unit 116 manages a port number for accepting a request from an information processing apparatus and the like.

Network control unit 120 exchanges data with another image forming apparatus and an information processing apparatus. More specifically, network control unit 120 includes a reception unit 122 for receiving data and a transmission unit 124 for transmitting data.

Image processing unit 130 temporarily holds image data scanned by scanner unit 110 and image data received from an information processing apparatus and executes image processing necessary for printing.

Drive control unit 118 controls driving each unit in connection with a print process in the image forming apparatus. More specifically, drive control unit 118 is a process logic for controlling a print engine.

Mail control unit 140 transmits a mail to another information processing apparatus and the like and receives a mail from another information processing apparatus and the like. More specifically, mail control unit 140 includes a transmission unit 142 and a reception unit 144.

C. Apparatus Configuration of Personal Computer

Figure 3:
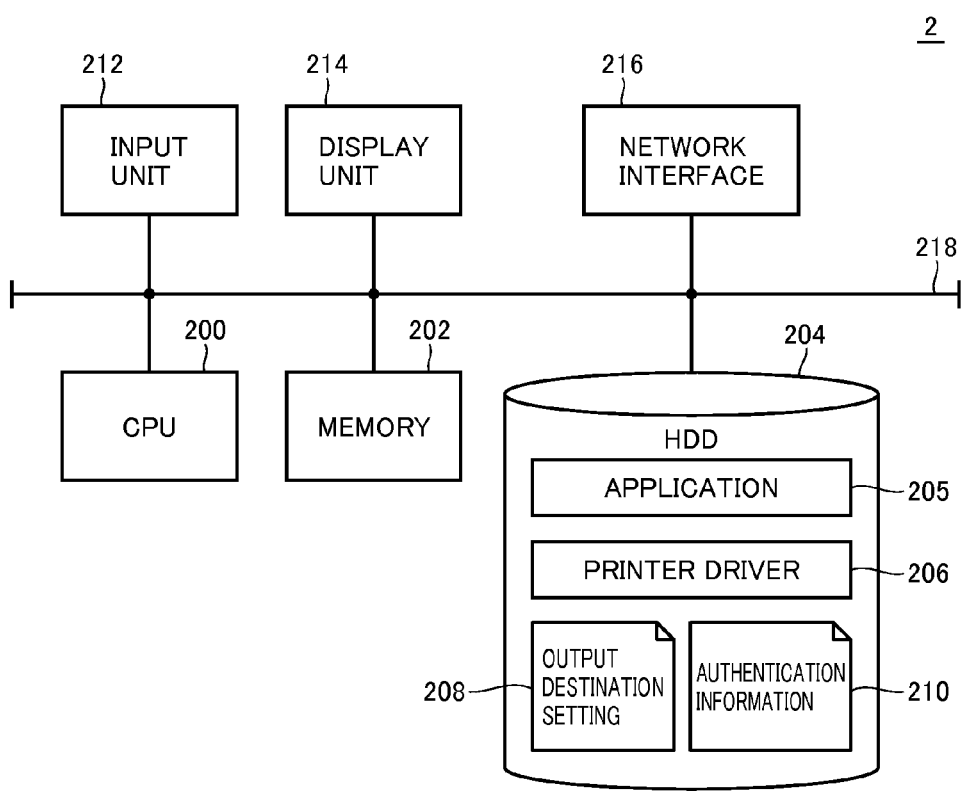
FIG. 3 is a block diagram showing an apparatus configuration of a personal computer according to the present embodiment.

An apparatus configuration of personal computer 2 directed to the network system according to the present embodiment will now be described. FIG. 3 is a block diagram showing an apparatus configuration of personal computer 2 according to the present embodiment.

Referring to FIG. 3, personal computer 2 includes a CPU 200, a memory 202, an HDD 204, an input unit 212, a display unit 214, and a network interface 216. These components are mutually connected via a bus 218.

CPU 200 executes a variety of programs including an operating system. Personal computer 2 may be configured so as to operate under a general-purpose operating system. Memory 202 functions as a working memory for CPU 200 to execute a program and temporarily holds a program expanded for execution and a variety of variables necessary for execution.

HDD 204 is typically a hard disk or a flash memory to store a program executed in CPU 200, and the like. More specifically, HDD 204 holds an application 205 for creating a document or a spreadsheet and a printer driver 206 for providing various processing described later. HDD 204 additionally holds output destination setting 208, which defines an output destination of a print job by printer driver 206, and authentication information 210 associated with the user who uses personal computer 2.

Input unit 212 includes a keyboard and a mouse to accept a user's operation. Display unit 214 displays a variety of information to be provided to the user in accordance with an instruction from CPU 200.

Network interface 216 exchanges data with image forming apparatus 1 and the like.

Typically, CPU 200 activates and executes printer driver 206 to provide various processing described later. A program including printer driver 206 for providing the function according to the present embodiment may be installed beforehand in HDD 204 or may be installed later using a variety of methods.

For example, the program may be installed into personal computer 2 through a storage medium such as a CD-ROM (Compact Disk-Read Only Memory) or a flash memory encoded with the program, or may be distributed to personal computer 2 through a network. In particular, an appropriate printer driver may be downloaded from any one of image forming apparatuses 1 as described later. In this case, personal computer 2 can be provided with various programs corresponding to the kind of image forming apparatus 1 so as to easily support a process dependent on the device kind.

Personal computer 2 may be implemented as a personal computer using a general-purpose architecture.

D. Process Procedure

A process procedure in the network system and it components according to the present embodiment will now be described.

(d1: Overall Process Procedure)

Figure 4:
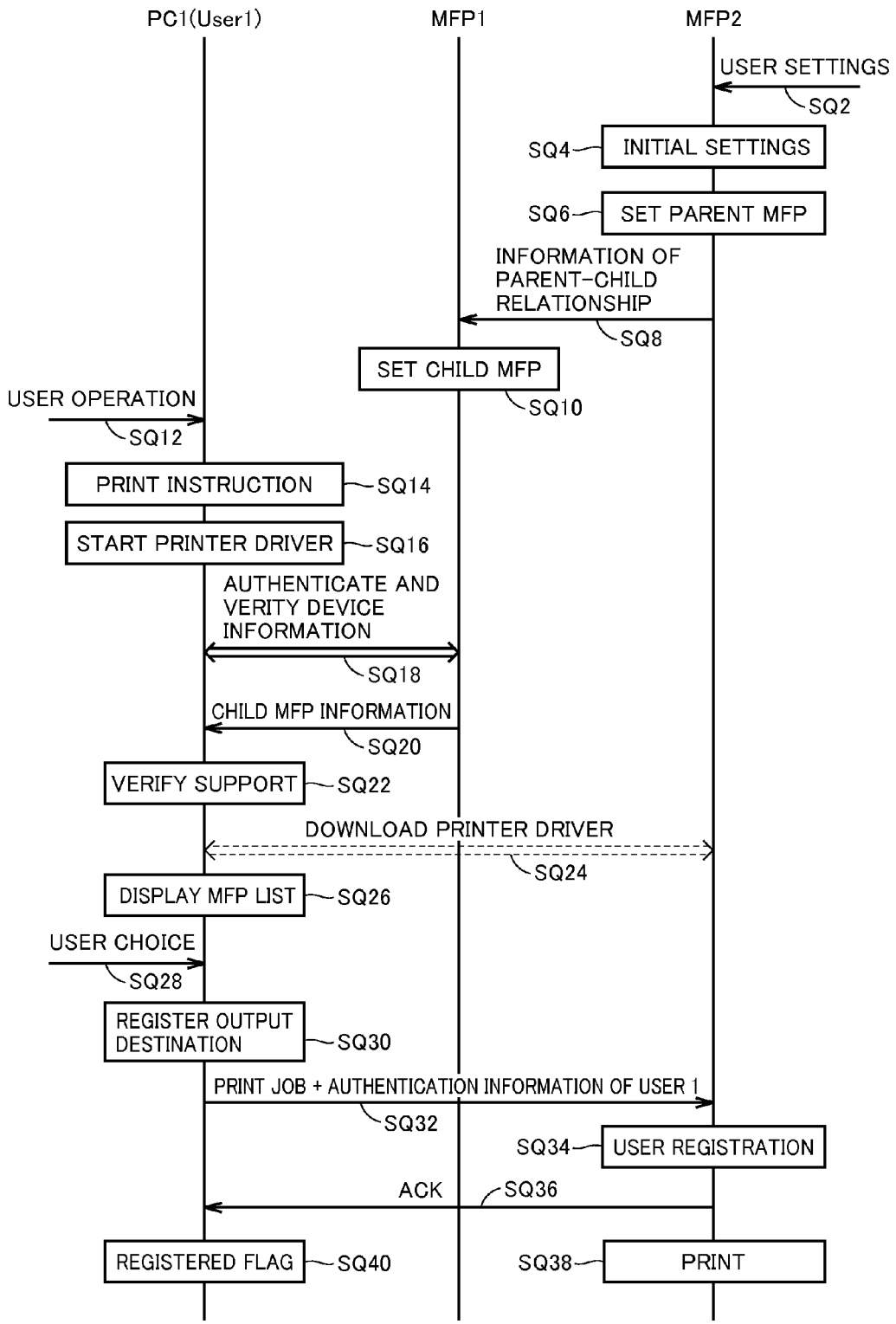
FIG. 4 is a sequence diagram showing an overall process procedure in the network system according to the present embodiment.

FIG. 4 is a sequence diagram showing an overall process procedure in the network system according to the present embodiment. In the network system shown in FIG. 4, security is maintained through an authentication process performed by each image forming apparatus. Each image forming apparatus has a function of setting a parent-child relationship. A plurality of print ports can be stored in the printer driver installed in PC 1.

Referring to FIG. 4, when MFP 2 is newly added to the network to which MFP 1 has already been connected, the administrator makes a variety of settings for the added MFP 2 (sequence SQ2). Based on the settings by the administrator, MFP 2 makes initial settings (sequence SQ4). More specifically, MFP 2 sets an MFP (in this example, MFP 1) serving as a parent in the MFP parent-child relationship and makes settings necessary for network connection (an IP address, a subnet mask, a comment indicating an installation place, and the like). Here, setting is also made for automatically notifying MFP 1 of the network information including the IP address of MFP 2 when MFP 2 is connected to the network. MFP 2 sets a parent MFP according to the settings by the administrator (sequence SQ6).

FIG. 5 shows an example of a user interface screen in connection with initial settings in image forming apparatus 1 according to the present embodiment. Referring to (a) in FIG. 5, the administrator enters a comment (in this example, the installation place) for the added image forming apparatus 1 and enters the IP address of the image forming apparatus serving as a parent in the parent-child relationship. It is assumed that the parent MFP shown in (a) in FIG. 5 is MFP 1 in the example in FIG. 4. A plurality of image forming apparatuses serving as parents may be set. In this case, as shown in (b) in FIG. 5, the IP address is entered for each of the parent MFP 1 and the parent MFP 2.

Returning to FIG. 4 again, MFP 2 transmits information of the set parent-child relationship to MFP 1 (sequence SQ8). MFP 1 then registers the child MFP based on the information of the parent-child relationship from MFP 2 (sequence SQ10). Specifically, MFP 1 adds to the parent-child relationship setting information 310-1 that MFP 2 is the child.

It is assumed that, after the setting of the parent-child relationship, a user (User 1) who operates personal computer PC 1 gives a print output instruction on any given application (sequence SQ12). Then, at PC 1, for example, OS (Operating System) issues an internal command to give a print instruction (sequence SQ14). Then, at PC 1, the printer driver is started in response to the print instruction (sequence SQ16).

PC 1 (printer driver) performs an authentication process and a process of verifying the device information with MFP 1 (sequence SQ18). In this authentication process, the authentication information (ID and password) for User 1 that is registered beforehand is transmitted from PC 1 to MFP 1. If this authentication process is successful, MFP 1 transmits information (IP address and the like) about MFP 2 serving as the child MFP to PC 1 (sequence SQ20). More specifically, when User 1 of PC 1 requests a print process in MFP 1, the printer driver checks the setting information with MFP 1, and the network information of MFP 2 is then returned to the printer driver.

The printer driver of PC 1 verifies whether it supports MFP 2, based on the information (child MFP information) of MFP 2 from MFP 1 (sequence SQ22). If the printer driver of PC 1 does not support MFP 2, PC 1 downloads a printer driver for MFP 2 from MFP 2 (sequence SQ24).

Subsequently, the printer driver of PC 1 displays an MFP list based on the information of MFP 2 received from MFP 1 (sequence SQ26). More specifically, PC 1 additionally stores the print port of MFP 2 and displays an MFP print port switch screen. In this switch screen, the IP address, the installation place and the like of MFP 2 are displayed together.

Figure 6:
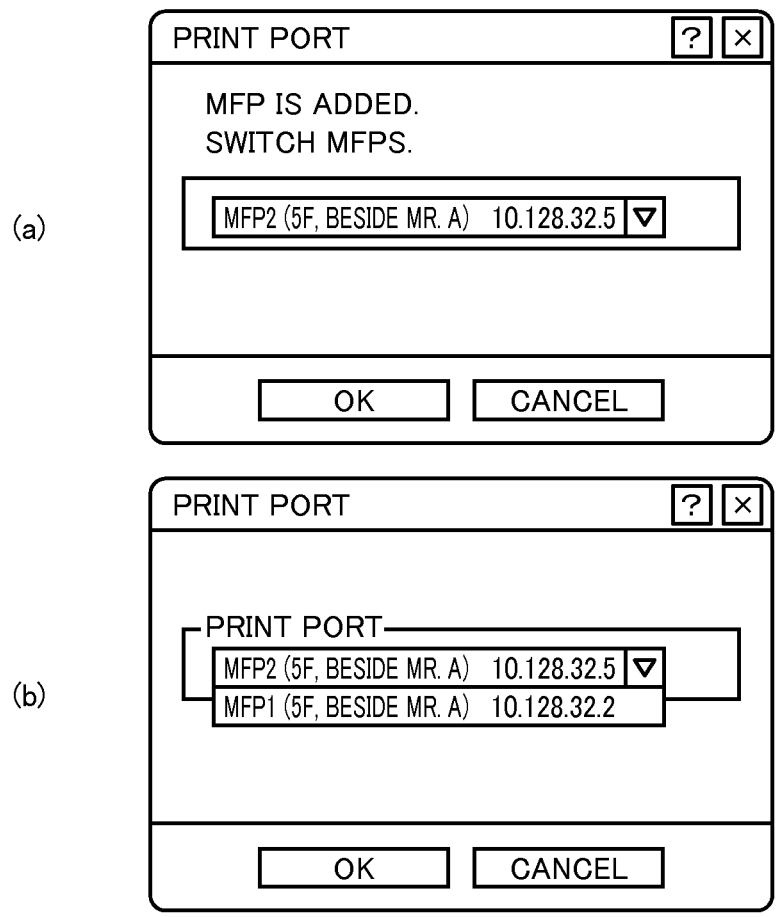
FIG. 6 shows an example of a user interface screen in connection with list display in the personal computer according to the present embodiment.

FIG. 6 shows an example of a user interface screen in connection with list display in the personal computer according to the present embodiment. Referring to (a) in FIG. 6, at the personal computer receiving the information about MFP 2 from MFP 1, a message appears to indicate that a new image forming apparatus is added, and the output destination is changed to the added image forming apparatus.

Here, as shown in (b) in FIG. 6, in a case where the user wishes to keep using MFP 1 that is the image forming apparatus before the change, a list including MFP 1 in addition to MFP 2 is displayed so that the user can make a choice.

Returning to FIG. 4 again, the user selects one of the image forming apparatuses (sequence SQ28). For example, the user selects MFP 2 in the print port switch screen appearing on PC 1 and presses an OK button. Then, the printer driver of PC 1 registers the default output destination (sequence SQ30). More specifically, in the printer driver of PC 1, its print port is automatically changed to the IP address of MFP 2.

Subsequently, PC 1 transmits a print job to MFP 2 that is the output destination (sequence SQ32). Here, the user authentication information of User 1 is attached to the print job.

When MFP 2 receives the print job and the user authentication information from PC 1, MFP 2 registers User 1 of PC 1 as a new user (sequence SQ34). MFP 2 then prints the received print job (sequence SQ38).

MFP 2 may send an acknowledgement (ACK) of registration of User 1 in MFP 2 to PC 1 (sequence SQ36). With this acknowledgement, PC 1 sets a registered flag in an entry related to the corresponding print port of MFP 2 in order to handle MFP 2 as the authorized output destination (sequence SQ40).

FIG. 7 and FIG. 8 show an example of a change in authentication information in user registration in image forming apparatus 1 according to the present embodiment.

In FIG. 7, (a) and (b) show authentication information 300-1 and 300-2 held in MFP 1 and MFP 2, respectively. In comparison between (a) and (b) of FIG. 7, the substantially same information as the information of User 1 registered in MFP 1 is added to authentication information 300-2 of MFP 2 when User 1 is newly registered.

As shown in FIG. 8, the entry of User 1 may be deleted from authentication information 300-1 of MFP 1 when User 1 is newly registered in authentication information 300-2 of MFP 2. In this case, User 1 uses MFP 2 exclusively, that is, User 1 is prohibited from using MFP 1. By employing the process as shown in FIG. 8, the image forming apparatuses to use can be changed for each user.

(d2: Process Procedure in New MFP)

A process procedure in an image forming apparatus (in the example shown in FIG. 4, MFP 2) newly added to the network will now be described.

Figure 9:
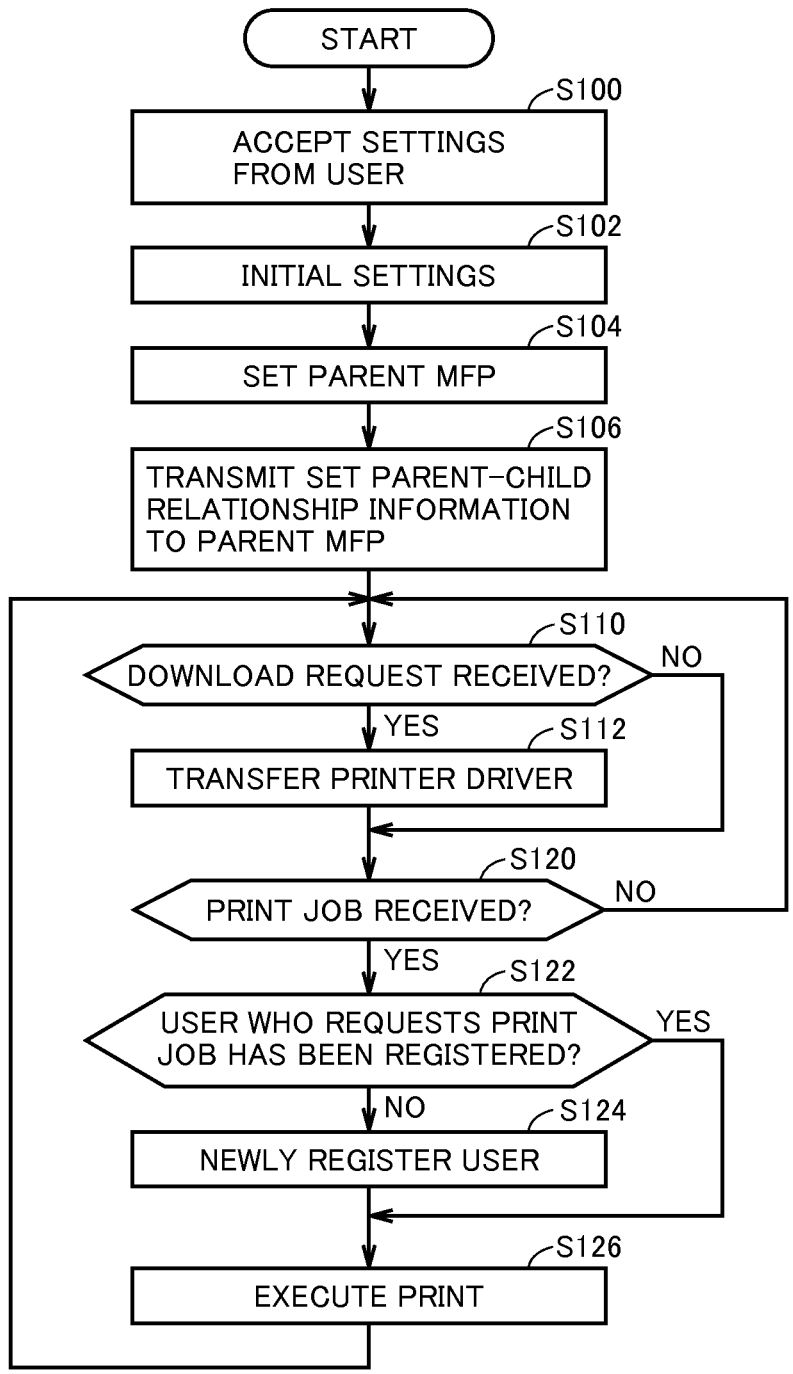
FIG. 9 is a flowchart showing a process procedure in a newly added image forming apparatus in the network system according to the present embodiment.

FIG. 9 is a flowchart showing a process procedure in the newly added image forming apparatus 1 in the network system according to the present embodiment. The steps shown in FIG. 9 are implemented by CPU 100 of image forming apparatus 1 executing a program.

Referring to FIG. 9, CPU 100 of image forming apparatus 1 accepts various settings from a user (step S100). Subsequently, CPU 100 makes initial settings including an IP address based on the input settings (step S102) and sets a parent MFP (step S104). CPU 100 then transmits information of the set parent-child relationship to the parent MFP (step S106).

Through the process above, the setting of the parent-child relationship is completed.

Thereafter, CPU 100 of image forming apparatus 1 determines whether a download request from any personal computer 2 is received (step S110). If a download request from any personal computer 2 is received (YES in step S110), CPU 100 transfers a printer driver to the personal computer that has made the request (step S112). If a download request is not received from any personal computer 2 (NO in step S110), the process in step S112 is skipped.

Subsequently, CPU 100 of image forming apparatus 1 determines whether a print job from any personal computer 2 is received (step S120). If a print job is not received from any personal computer 2 (NO in step S120), the process following step S110 is repeated.

By contrast, if a print job is received from any personal computer 2 (YES in step S120), CPU 100 determines whether the user who requests the print job is registered, based on the use authentication information attached to the print job (step S122).

If the user who requests the print job is not registered (NO in step S122), CPU 100 newly registers the user (step S124). By contrast, if the user who requests the print job is registered (YES in step S122), the process in step S124 is skipped.

Subsequently, CPU 100 executes printing for the received print job (step S126). Then, the process following step S110 is repeated.

(d3: Process Procedure in Existing MFP)

A process procedure in an image forming apparatus (in the example shown in FIG. 4, MFP 1) already connected to the network will now be described.

Figure 10:
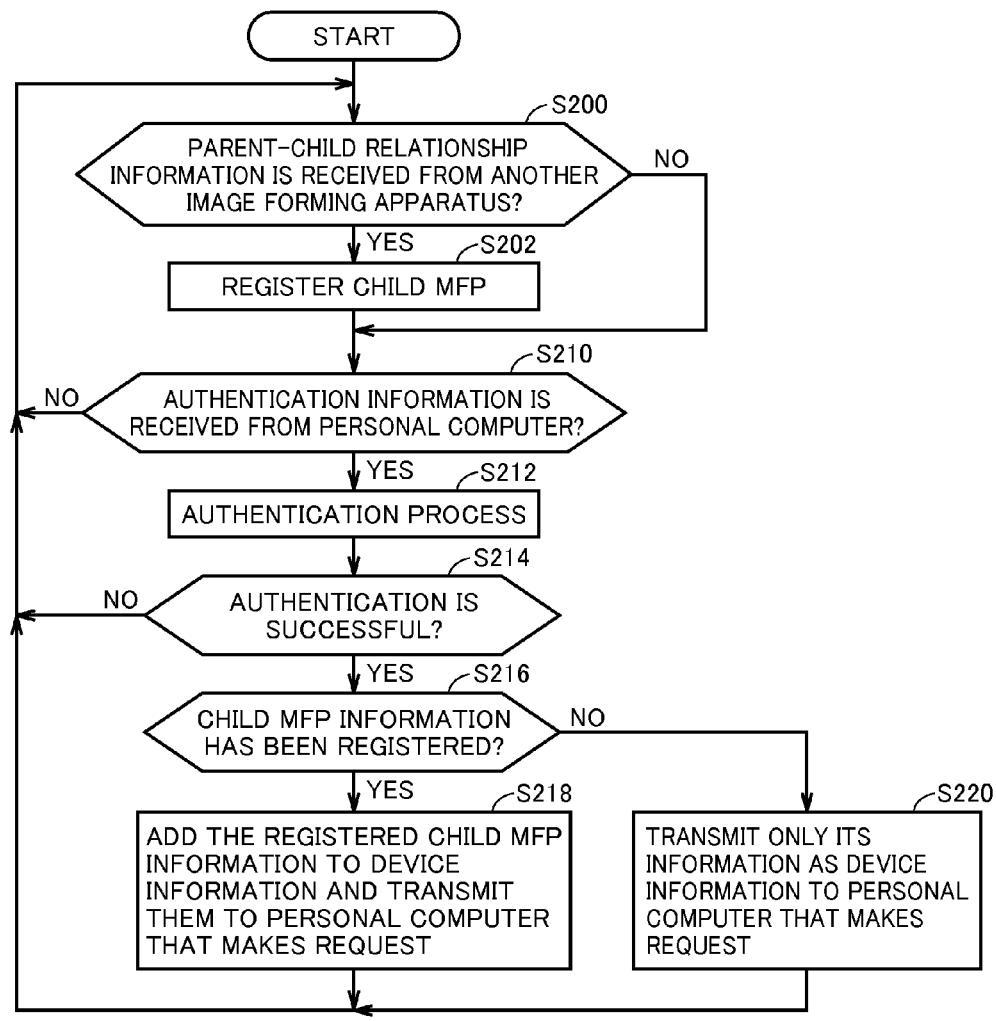
FIG. 10 is a flowchart showing a process procedure in an existing image forming apparatus in the network system according to the present embodiment.

FIG. 10 is a flowchart showing a process procedure in the existing image forming apparatus 1 in the network system according to the present embodiment. The steps shown in FIG. 10 are implemented by CPU 100 of image forming apparatus 1 executing a program.

Referring to FIG. 10, CPU 100 of image forming apparatus 1 determines whether information of the parent-child relationship is received from another image forming apparatus (step S200). If information of the parent-child relationship is received from another image forming apparatus (YES in step S200), CPU 100 registers the child MFP, based on the received information of the parent-child relationship (step S202).

Through the process above, the setting of the parent-child relationship is completed.

If information of the parent-child relationship is not received from another image forming apparatus (NO in step S200), the process in step S202 is skipped.

Thereafter, CPU 100 of image forming apparatus 1 determines whether authentication information is received from any personal computer 2 (step S210). If authentication information is received from any personal computer 2 (YES in step S210), CPU 100 executes an authentication process by comparing its held authentication information with the received authentication information (step S212). If authentication information is not received from any personal computer 2 (NO in step S210), the process following step S200 is repeated.

Subsequently, CPU 100 determines whether the authentication is successful (step S214). If the authentication is not successful (NO in step S214), the process following step S200 is repeated.

On the other hand, if the authentication is successful (YES in step S214), CPU 100 determines whether child MFP information is registered (step S216). If child MFP information is registered (YES in step S216), CPU 100 attaches the registered child MFP information to the device information for transmission to the personal computer that has made a request (step S218).

If child MFP information is not registered (NO in step S216), CPU 100 transmits only its information as the device information to the personal computer that has made a request (step S220).

Then, the process following step S200 is repeated.

(d4: Process Procedure in Information Processing Apparatus)

A process procedure in an information processing apparatus (in the example shown in FIG. 4, PC 1) connected to the network will now be described.

Figure 11:
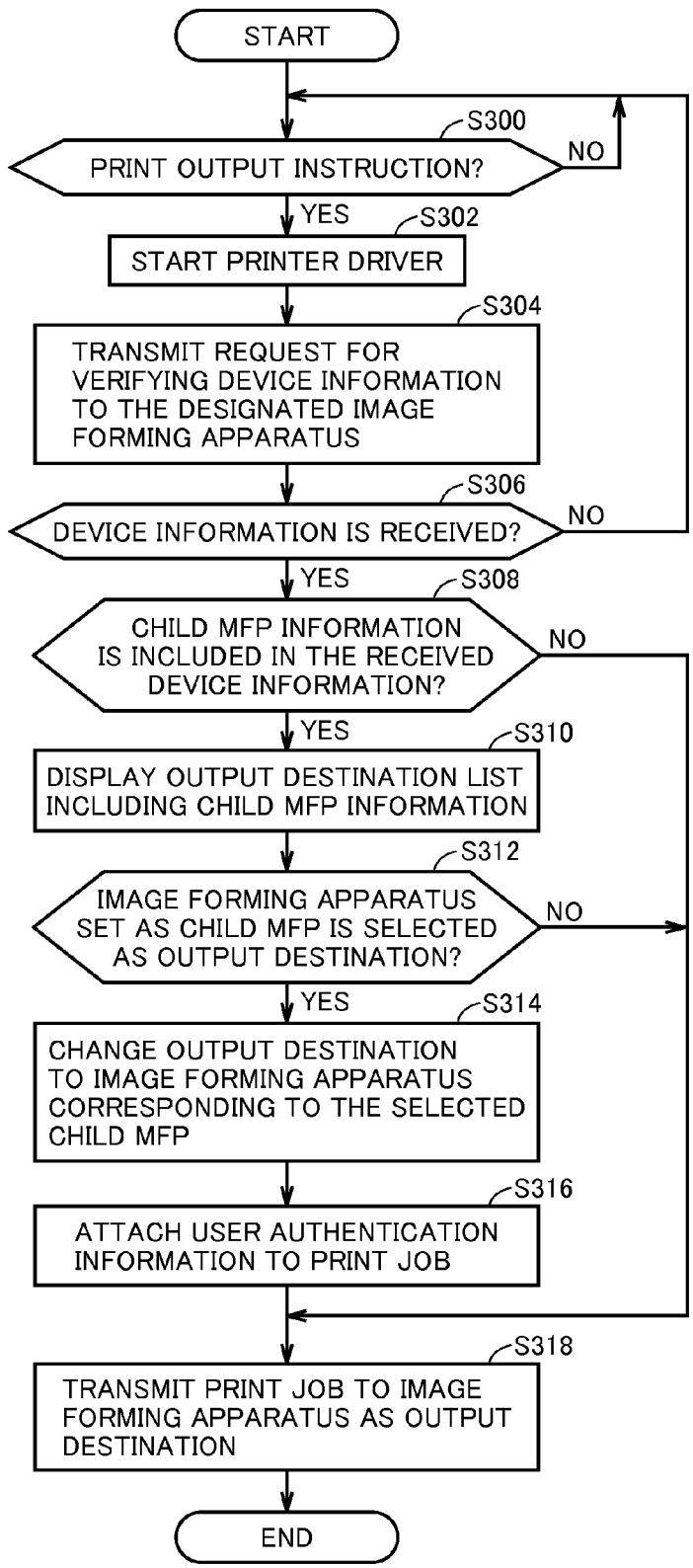
FIG. 11 is a flowchart showing a process procedure in an information processing apparatus in the network system according to the present embodiment.

FIG. 11 is a flowchart showing a process procedure in an information processing apparatus in the network system according to the present embodiment. The steps shown in FIG. 11 are implemented by CPU 200 of personal computer 2, that is, the information processing apparatus, executing a program.

Referring to FIG. 11, CPU 200 of personal computer 2 determines whether a print output instruction is given on the running application (step S300). If a print output instruction is not given (NO in step S300), the process in step S300 is repeated.

If a print output instruction is given (YES in step S300), CPU 200 activates the printer driver (step S302) and transmits the user authentication information as well as a request for verifying the device information to the designated image forming apparatus 1 (step S304). Subsequently, CPU 200 determines whether the device information is received from image forming apparatus 1 to which the request is submitted (step S306). If the device information is not received from image forming apparatus 1 to which the request is submitted (NO in step S306), the process following step S300 is repeated.

If the device information is received from image forming apparatus 1 to which the request is submitted (YES in step S306), CPU 200 determines whether child MFP information is included in the received device information (step S308). If child MFP information is included in the received device information (YES in step S308), CPU 200 displays an output destination list including the child MFP information included in the device information (step S310).

Subsequently, CPU 200 determines whether image forming apparatus 1 set as a child MFP is selected as an output destination in the output destination list (step S312). If image forming apparatus 1 set as a child MFP is selected as an output destination (YES in step S312), CPU 200 changes the output destination to image forming apparatus 1 corresponding to the selected child MFP (step S314) and attaches the user authentication information to the print job (step S316).

If child MFP information is not included in the received device information (NO in step S308), the process in steps S310 to S316 is skipped. If image forming apparatus 1 set as a child MFP is not selected as an output destination (NO in step S312), the process in steps S314 and S316 is skipped.

CPU 200 then transmits the print job (the user authentication information, in some cases) to image forming apparatus 1 as the output destination (step S318).

E. First Modification

In the foregoing embodiment, when receiving access from personal computer 2, the newly added image forming apparatus 1 registers the user of personal computer 2. By contrast, authentication information 300 of the user may be transferred from the parent image forming apparatus 1 to the child image forming apparatus 1 at the time when the parent-child relationship is set.

Specifically, the existing image forming apparatus 1 in the network may transmit the authentication information to the newly added image forming apparatus in response to the parent setting information from the newly added image forming apparatus 1, and the newly added image forming apparatus 1 may perform an authentication process by referring to the authentication information from the existing image forming apparatus 1, in response to access from personal computer 2.

Figure 12:
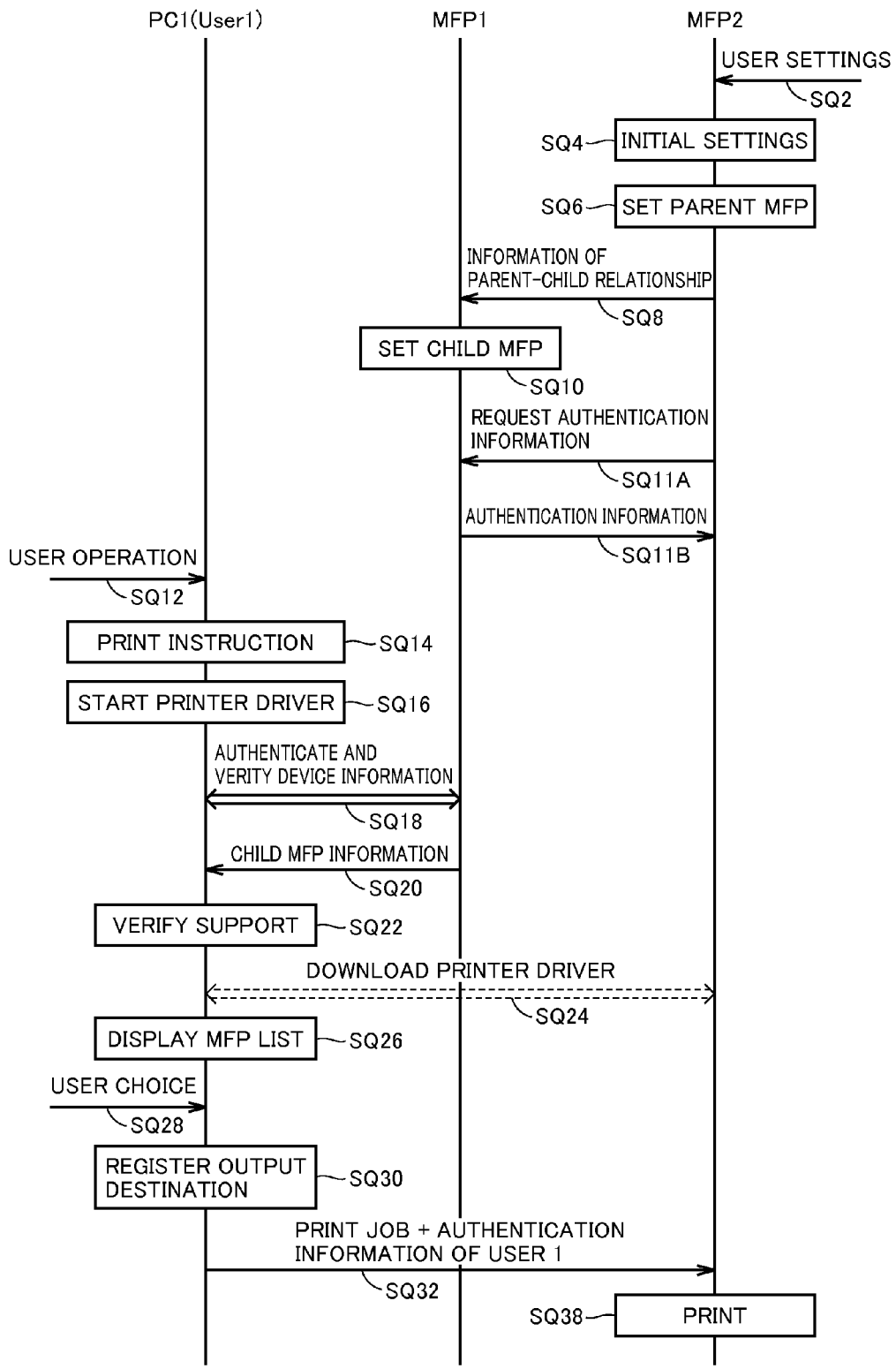
FIG. 12 is a sequence diagram showing an overall process procedure in a network system according to a first modification of the present embodiment.

FIG. 12 is a sequence diagram showing an overall process procedure in a network system according to a first modification of the present embodiment. The sequence diagram shown in FIG. 12 differs from the sequence diagram in FIG. 4 in that sequences SQ34, SQ36, and SQ40 are replaced with sequences SQ11A and SQ11B.

More specifically, when MFP 1 adds to the parent-child relationship setting information 310-1 that MFP 2 is the child, MFP 2 requests authentication information from MFP 1 (sequence SQ11A). In response to the request for authentication information, MFP 1 transmits its held authentication information 300-1 to MFP 2 (sequence SQ11B). MFP 2 holds the authentication information received from MFP 1 as its own authentication information 300-2.

The process excluding the above is the same as in FIG. 4, and, therefore, a detailed description thereof will not be repeated.

F. Second Modification

In the foregoing embodiment, the user explicitly designates an image forming apparatus 1 serving as the parent MFP of the newly added image forming apparatus 1. By contrast, a notice to indicate the presence of the newly added image forming apparatus 1 may be given to the existing network, and an image forming apparatus 1 that responds to the notice may be registered as a parent MFP.

Specifically, the newly added image forming apparatus 1 may send a broadcast to the network and may register a parent MFP based on a response from another image forming apparatus 1 that has responded to the broadcast.

Figure 13:
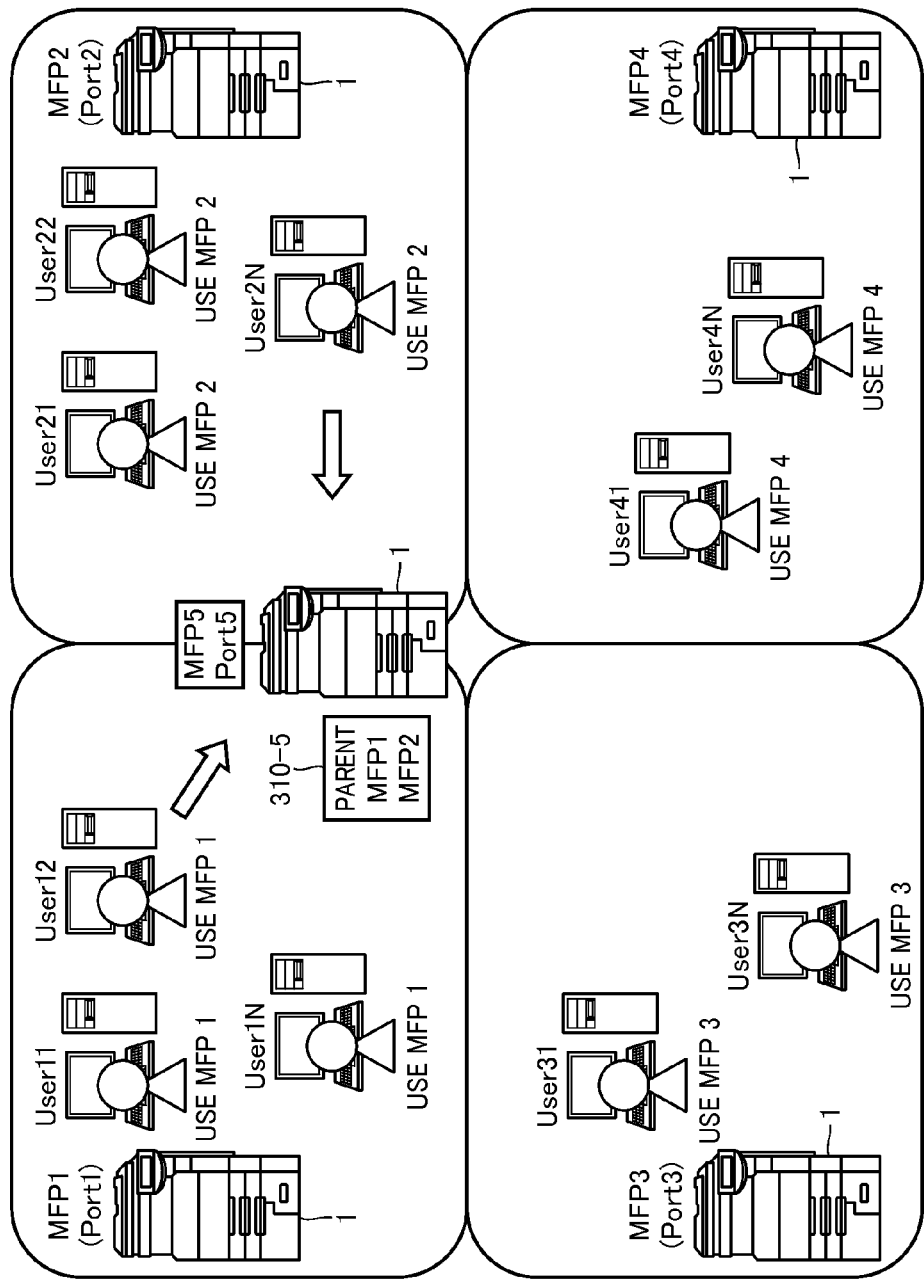
FIG. 13 is a schematic diagram showing an example of a network system according to a second modification of the present embodiment.

FIG. 13 is a schematic diagram showing an example of a network system according to a second modification of the present embodiment. Referring to FIG. 13, for example, it is assumed that a plurality of departments have the respective MFP 1 to MFP 4. It is also assumed that MFP 1 is used by users User 11, User 12, . . . , User 1N. This is applicable to MFP 2, MFP 3, and MFP 4.

In this state, suppose that the utilization becomes high in every image forming apparatus, and an image forming apparatus is added to be shared among the plurality of departments. Here, MFP 5 is newly added. Here, the IP address and the like of the image forming apparatus serving as a parent MFP may be set in MFP 5. However, in terms of user-friendliness, it is more preferable to dynamically set a parent MFP depending on the presence of other image forming apparatuses connected to the same network.

Specifically, when MFP 5 is newly connected to the network, a broadcast is sent to the network. If an image forming apparatus 1 is present in the same network and that image forming apparatus 1 permits the setting of the parent-child relationship, the image forming apparatus 1 has responded to the broadcast. Then, the image forming apparatus 1 that transmits the broadcast registers the image forming apparatus 1 that has responded, as a parent MFP. If a plurality of MFPs respond, one of the MFPs may be selected as a parent MFP. Alternatively, the plurality of MFPs may be registered as parent MFPs. In a network that adopts DHCP (Dynamic Host Configuration Protocol), the IP address is automatically set.

In such a case, for example, only part of the users who have used MFP 1 and part of the users who have used MFP 2 may shift to use MFP 5.

Such a process procedure is represented as a sequence diagram as follows.

Figure 14:
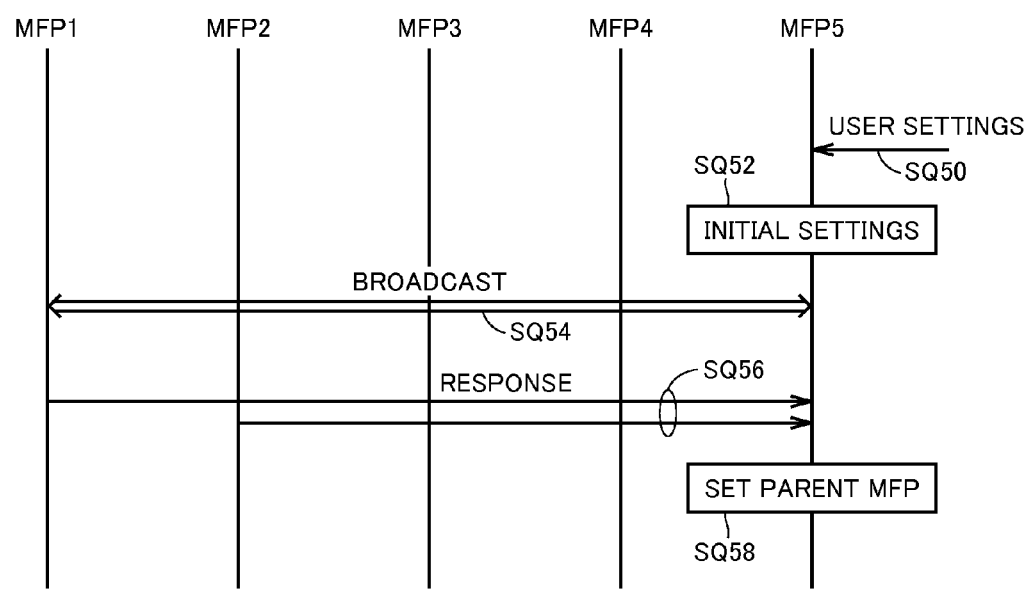
FIG. 14 is a sequence diagram showing a process procedure of a main part in the network system according to the second modification of the present embodiment.

FIG. 14 is a sequence diagram showing a process procedure of a main part in the network system according to the second modification of the present embodiment. Referring to FIG. 14, after MFP 5 is newly added to the network, the administrator makes a variety of settings for the newly added MFP 5 (sequence SQ50). Based on the settings made by the administrator, MFP 5 makes initial settings. Specifically, MFP 5 makes settings (an IP address, a subnet mask, a comment indicating an installation place, and the like) necessary for network connection.

Subsequently, MFP 5 sends a broadcast in the network to which it connects (sequence SQ54). In this example, it is assumed that only MFP 1 and MFP 2 respond to the broadcast (sequence SQ56). MFP 5 sets MFP 1 and/or MFP 2 as parent MFP(s) in accordance with the responses from MFP 1 and MFP 2 (sequence SQ58).

The process excluding the above is the same as in the forgoing embodiment, and, therefore, a detailed description thereof will not be repeated.

A change in authentication information 300 held by each image forming apparatus 1 in the example shown in FIG. 14 will be described. FIG. 15 shows an example of a change in authentication information in image forming apparatus 1 according to the second modification of the present embodiment. In FIG. 15, (a) to (d) show data examples before and after change of authentication information 300 held by MFP 1, MFP 2, MFP 3, and MFP 5, respectively.

FIG. 15 shows an example in which User 12 and User 16 who have used MFP 1, and User 24, User 28, and User 29 who have used MFP 2 come to use MFP 5. More specifically, the entries of the users above are deleted from authentication information 300 shown in (a) and (b) in FIG. 15, while the entries of the users whose image forming apparatuses have been changed are added to authentication information 300 of MFP 5 shown in (d) in FIG. 15. As shown in (c) in FIG. 15, authentication information 300 of MFP 3 is not changed because a parent-child relationship is not set in MFP 3.

G. Advantages

In the present embodiment, because of the setting of the parent-child relationship among a plurality of image forming apparatuses, personal computer 2 (user) authenticated in the parent MFP has its authentication information registered in the child MFP as a new user. Therefore, the administrator does not have to register the authentication information of the user in the newly added image forming apparatus 1. The user information is automatically registered in the newly added image forming apparatus in this way, thereby saving time and trouble for making settings for the newly added image forming apparatus.

At personal computer 2 used by the user, a list of image forming apparatuses 1 to be changed is displayed to allow the user to easily change image forming apparatus 1 serving as an output destination. In this manner, the setting by the user who uses the added image forming apparatus can also be simplified.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A system comprising;
a first image forming apparatus connected to a network;
a second image forming apparatus
configured to generate parent setting information, upon connection to said network, specifying said first image forming apparatus previously connected to said network as its parent and transmit the parent setting information to said first image forming apparatus; and
an information processing apparatus connected to said network,
wherein said first image forming apparatus includes;
a generation unit for generating parent-child relationship setting information indicating a parent-child relationship between said first image forming apparatus and said second image forming apparatus, based on said parent setting information received from said second image forming apparatus, and
a transmission unit for transmitting information of said second image forming apparatus to said information processing apparatus, based on said parent-child relationship setting information, in response to access from said information processing apparatus, and
wherein said information processing apparatus includes a first registration unit for registering said second image forming apparatus as a new output destination, based on the information of said second image forming apparatus received from said first image forming apparatus.

2. The system according to claim 1, wherein
the first image forming apparatus further includes a first authentication unit for performing authentication by referring to authentication information registered beforehand, in response to access from said information processing apparatus, and
said transmission unit transmits the information of said second image forming apparatus on condition that the authentication is successful.

3. The system according to claim 2, wherein said second image forming apparatus further includes a second registration unit for registering information about said information processing apparatus as at least part of authentication information held by said second image forming apparatus, in response to a print instruction from said information processing apparatus.

4. The system according to claim 2, wherein
said transmission unit further transmits said authentication information to said second image forming apparatus, in response to receiving said parent setting information from said second image forming apparatus, and
said second image forming apparatus further includes a second authentication unit for performing authentication by referring to said authentication information from said first image forming apparatus, in response to access from said information processing apparatus.

5. The system according to claim 1, wherein
said first registration unit includes
a unit for displaying a list of output destinations, and
a unit for accepting a choice by a user from the displayed list.

6. The system according to claim 1, wherein said information processing apparatus further includes an acquisition unit for acquiring a necessary printer driver from said second image forming apparatus when a printer driver corresponding to said second image forming apparatus does not exist.

7. The system according to claim 1, wherein the access to said first image forming apparatus from said information processing apparatus includes a print instruction from said information processing apparatus.

8. The system according to claim 1, wherein said first registration unit registers a new output destination on a user interface screen provided by a printer driver of said information processing apparatus.

9. The system according to claim 1, wherein said second image forming apparatus generates said parent setting information based on a response from another image forming apparatus that has responded to a broadcast.

10. A method for providing image forming apparatus information to an information processing apparatus by a system comprising a first image forming apparatus, a second image forming apparatus, and an information processing apparatus connected via a network, comprising the steps of:
connecting said second image forming apparatus to said network, wherein said first image forming apparatus has been previously connected to said network;
generating, by a said second image forming apparatus, parent setting information indicating that said first image forming apparatus previously connected to said network is a parent of said second image forming apparatus, when said second image forming apparatus is added to said network;
transmitting parent setting information from said second image forming apparatus to said first image forming apparatus;
generating, by said first image forming apparatus, parent-child relationship setting information indicating a parent-child relationship between said first image forming apparatus and said second image forming apparatus, based on said parent setting information received from said second image forming apparatus,
transmitting, by said first image forming apparatus, information of said second image forming apparatus to said information processing apparatus, based on said parent-child relationship setting information, in response to access from said information processing apparatus, and
registering, by said information processing apparatus, said second image forming apparatus as a new output destination, based on the information of said second image forming apparatus received from said first image forming apparatus.

11. An image forming apparatus connectable to an information processing apparatus and an additional image forming apparatus via a network, comprising a processor configured to:
generate parent-child relationship setting information indicating a parent-child relationship between said image forming apparatus and a said additional image forming apparatus, based on parent setting information sent from said additional image forming apparatus specifying said image forming apparatus as a parent of said additional image forming apparatus, the parent setting information being generated when said additional image forming apparatus is added to said network; and
transmit information of said additional image forming apparatus to said information processing apparatus, based on said parent-child relationship setting information, in response to access from said information processing apparatus.

12. A non-transitory storage medium encoded with a program executed in an image forming apparatus connectable to an information processing apparatus and an additional image forming apparatus via a network, said program causing said image forming apparatus to execute processing comprising the steps of:
generating parent-child relationship setting information indicating a parent-child relationship between a said image forming apparatus and said additional image forming apparatus, based on parent setting information sent from said additional image forming apparatus specifying said image forming apparatus as a parent of said additional image forming apparatus, said parent setting information being generated when said additional image forming apparatus is added to said network; and
transmitting information of said additional image forming apparatus to said information processing apparatus, based on said parent-child relationship setting information, in response to access from said information processing apparatus.

13. An image forming apparatus connectable to an information processing apparatus and an other image forming apparatus via a network, comprising a processor configured to:
generate parent setting information specifying said other image forming apparatus previously connected to said network as a parent of said image forming apparatus, when said image forming apparatus is added to said network; and
transmit said parent setting information to said other image forming apparatus.

14. A non-transitory storage medium encoded with a program executed in an image forming apparatus connectable to an information processing apparatus and an other image forming apparatus via a network, said program causing said image forming apparatus to execute processing comprising the steps of:
generating parent setting information specifying said other image forming apparatus previously connected to said network as a parent of said image forming apparatus, when said image forming apparatus is added to said network; and
transmitting said parent setting information to said other image forming apparatus.

15. An information processing apparatus connectable to a plurality of image forming apparatuses, including a first image forming apparatus and a second image forming apparatus, via a network, comprising:
receiving means for, when said second image forming apparatus is newly added in a state in which said first image forming apparatus is connected to said network, receiving, from said first image forming apparatus, information of said second image forming apparatus based on parent-child relationship setting information, after said parent-child relationship setting information is set to indicate that said first image forming apparatus is a parent of said second image forming apparatus; and
registration means for registering said second image forming apparatus as a new output destination, based on the information of said second image forming apparatus.

16. A non-transitory storage medium encoded with a program executed in an information processing apparatus connectable to a plurality of image forming apparatuses, including a first image forming apparatus and a second image forming apparatus, via a network, said program causing said information processing apparatus to execute processing comprising the steps of:
receiving from said first image forming apparatus, information of a said second image forming apparatus based on parent-child relationship setting information, after said parent-child relationship setting information is set to indicate that said first image forming apparatus is a parent of said second image forming apparatus, after said second image forming apparatus is newly added in a state in which said first image forming apparatus is connected to said network; and
registering said second image forming apparatus as a new output destination, based on the information of said second image forming apparatus.

17. The system according to claim 1, wherein the parent setting information is set on the second image forming apparatus by administrator.

18. The system according to claim 1, wherein the parent setting information is set based on a reply from the first image forming apparatus.

19. The system according to claim 1, wherein the parent setting information includes an address of the first image forming apparatus, and the parent-child relationship setting information includes an address of the second image forming apparatus.

* * * * *